United States Patent [19]

Rosquist

[11] 3,927,911
[45] Dec. 23, 1975

[54] VERTICAL ADJUSTABLE COLLAPSIBLE SEAT

[76] Inventor: Gerald L. Rosquist, 71 S. 3rd East, Salina, Utah 84654

[22] Filed: Apr. 21, 1975

[21] Appl. No.: 570,269

[52] U.S. Cl. .................. 297/15; 297/17; 297/338; 296/69; 248/400
[51] Int. Cl.² ......................................... B60P 3/38
[58] Field of Search ....... 297/15, 17, 338, 347, 380, 297/DIG. 3, 217; 248/400–403; 296/63, 69

[56] References Cited
UNITED STATES PATENTS

| | | | |
|---|---|---|---|
| 401,079 | 4/1889 | Stone | 297/380 |
| 958,000 | 5/1910 | Peterson | 297/15 |
| 1,124,769 | 1/1915 | McLeod | 297/15 X |
| 2,270,233 | 1/1942 | Shaw | 297/347 |
| 2,665,746 | 1/1954 | Darter | 297/338 |
| 3,166,799 | 1/1965 | Birnkrant | 297/15 X |
| 3,290,086 | 12/1966 | Petrak | 297/217 X |
| 3,727,970 | 4/1973 | Delmage | 296/69 X |

*Primary Examiner*—Francis K. Zugel
*Attorney, Agent, or Firm*—Criddle & Thorpe

[57] ABSTRACT

A collapsible seat for use in pickup trucks and the like which is totally enclosed in the collapsed position by a floor, sidewalls, endwalls and a top. The top is pivotally connected to one of the sidewalls. A backrest is attached to the underside of the top of the enclosure. The seat itself is vertically adjustable by pneumatic means and consists of two pneumatically interconnected pairs of telescoping legs, one pair at either end of the seat. Each pair of legs is also interconnected at the top by an armrest. When pressurized air is introduced into each pair of telescoping legs an airtight chamber within said telescoping legs is caused to expand thereby forcing the seat upwardly in a vertical direction. The seat may be collapsed by removing the air from the airtight chambers within the telescoping legs and folding the backrest downwardly over the seat.

10 Claims, 7 Drawing Figures

3,927,911

VERTICAL ADJUSTABLE COLLAPSIBLE SEAT

BACKGROUND OF THE INVENTION

The invention relates to a vertically adjustable, collapsible seat. More particularly, this invention is related to a vertically adjustable, collapsible seat which is totally enclosed in the collapsed position, and is designed to fit into the bed of a pickup truck or the like such that the flat surface of the enclosed seat, when collapsed, provides a cargo carrying area.

On numerous occasions it is desirable to provide extra seating capacity in pickup trucks, vans, or other vehicles which are designed primarily for cargo carrying. In the past this has been accomplished by moving temporary seating such as chairs, benches and the like into the bed of the vehicle or permanently attaching seats or benches into said vehicle thereby limiting the cargo carrying capacity of the vehicle.

It is an object of the present invention to provide a collapsible, vertically adjustable seat for use in a cargo carrying vehicle which will utilize a minimum of space.

It is a further object of this invention to provide a collapsible seat which is vertically adjustable and which in the closed position presents a flat surface, which when placed in a cargo carrying vehicle will serve as a cargo carrying area.

It is a still further object of the present invention to provide a vertically adjustable, collapsible, totally enclosed seat for cargo carrying vehicles wherein the seat in a collapsed position will be below the sidewalls of the bed of the cargo carrying vehicle.

Another object of this invention is to provide a collapsible, vertically adjustable seat for cargo carrying vehicles wherein the seat portion is vertically adjustable by pneumatic means and the backrest portion is fixedly attached to the underside of the cover of the enclosure.

An additional object of this invention is to provide a collapsible, vertically adjustable seat for cargo carrying vehicles wherein movement of the enclosure is restricted from a closed position to a substantially upright position.

These and other objects may be accomplished by means of a totally enclosed, collapsible seat wherein the enclosure consists of a floor, a a frontwall, a backwall, two endwalls, and a top pivotally attached to the backwall of the enclosure. Attached to the floor of the enclosure are two pairs of telescoping legs, each leg having an airtight, vertically adjustable pneumatic cylinder which is interconnected with the other cylinder forming the pair. Attached to the movable portion of the telescoping legs at either end is a seat, therefore, when air is forced into the cylinder, the cylinder portion of the legs and seat will move upwardly and when air is removed from the cylinder, the legs will telescope and the seat will move downwardly. A backrest is fixedly attached to the underside of the top of the enclosure and means are provided whereby movement of the enclosure top is limited to movement from a closed position to a substantially upright position. Each pair of telescoping legs is connected at the top by an armrest which may or may not interconnect the pneumatic cylinders of each telescoping leg.

While the seats may be of any desired length and height, the width, the distance between the backwall and the frontwall is sufficient to provide for leg space between the front edge of the seat and the frontwall.

The seat enclosures are so constructed that when the enclosure is in a closed position the top of the seat will provide a flat surface capable of holding cargo and which, therefore, reduces the cargo carrying capacity of the vehicle to a minimum.

The novel features of this invention both as to the manner of construction or organization as well as the operation will be better understood with reference to the following description and drawings. It is to be understood, however, that the description and drawings are for the purpose of illustration only, and not intended to be definitive as to the scope of this invention.

DRAWINGS OF THE INVENTION

DETAILED DESCRIPTION

Figure 1:
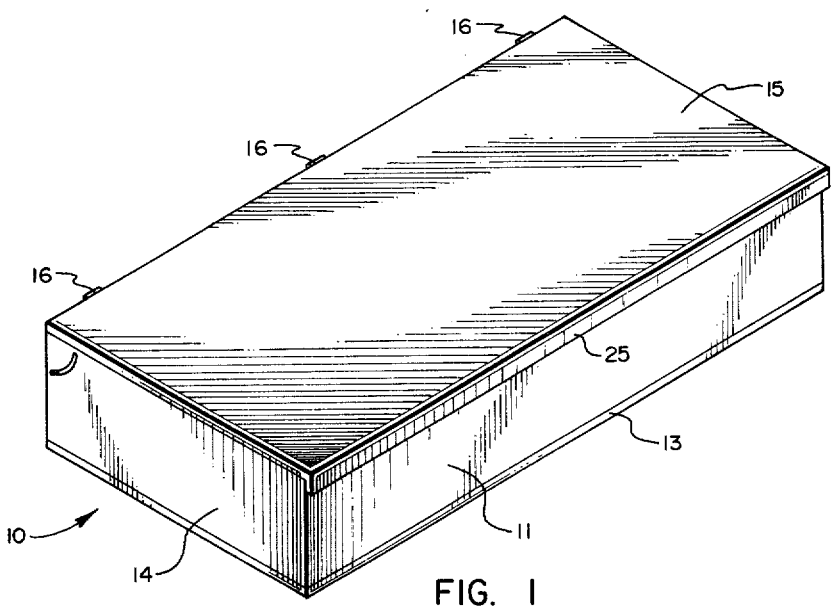
FIG. 1 is a perspective view of the collapsible seat enclosure in a closed position.

Referring now to the drawings:

There is shown in FIG. 1 a perspective view of the enclosure 10 having a frontwall 11, a backwall 12 (not shown), a floor 13, two endwalls 14, and a cover 15 which is pivotally attached to the backwall by means of hinges 16 or other appropriate means.

Figure 2:
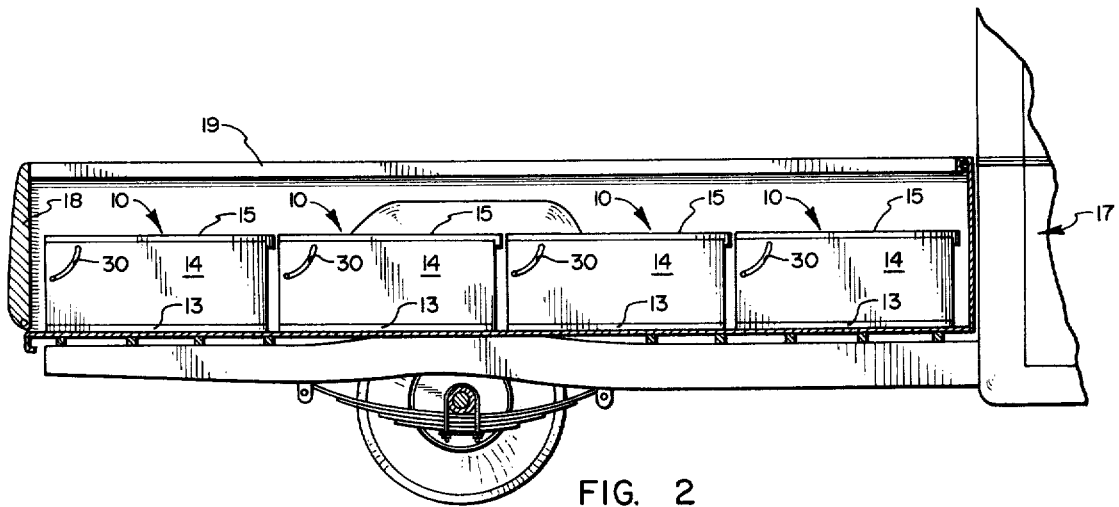
FIG. 2 is a side elevational view of the collapsible seat of the invention in closed position placed in a cargo carrying vehicle shown in cut away form.
Figure 3:
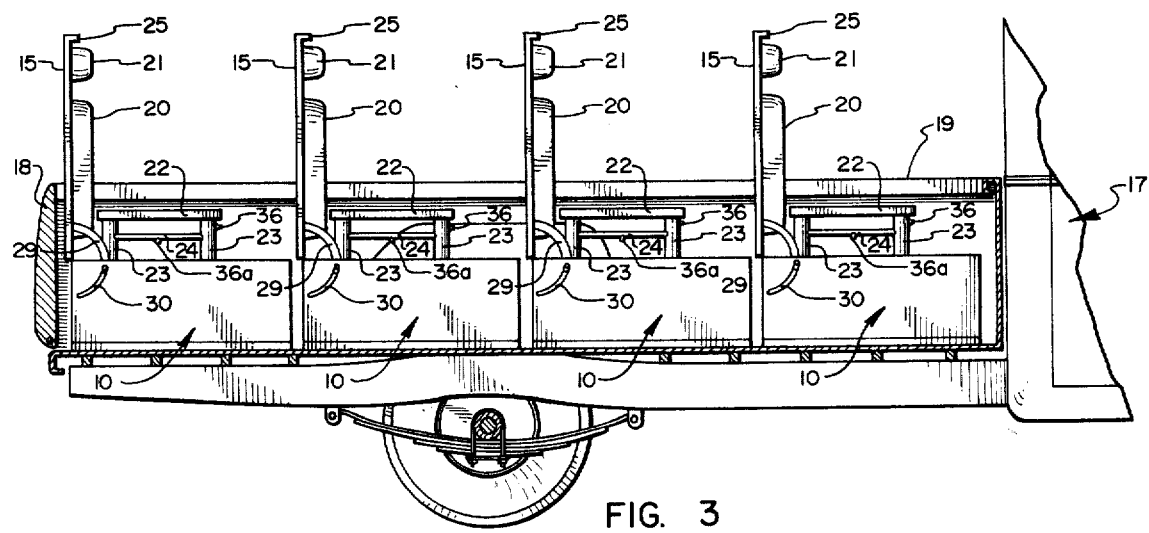
FIG. 3 is a side elevational view as in FIG. 2 but with the seat enclosure in an upright position.

The versatility of the collapsible seat is shown in FIGS. 2 and 3 which consist of a cargo carrying vehicle 17 in partial form having a cut away bed portion 18 into which the collapsible seat enclosures 10 are placed. FIGS. 2 and 3 represent only one of any number of configurations into which the seats can be placed and the arrangement is illustrative only. As illustrated in FIG. 2, when the cover of the enclosure is in a closed position, a flat surface area is available for loading cargo which is below the sidewalls 19 of the vehicle bed 18.

When the enclosure cover 15 is raised to an upright position and the telescoping legs pneumatically filled as will be described hereinafter, a seating system becomes readily available as illustrated in FIG. 3. FIG. 3 illustrates a backrest 20 and a headrest 21, an armrest 22 connecting the top of the cylinder portion 23 of one pair of telescoping legs and also containing interconnecting air means 24.

Figure 4:
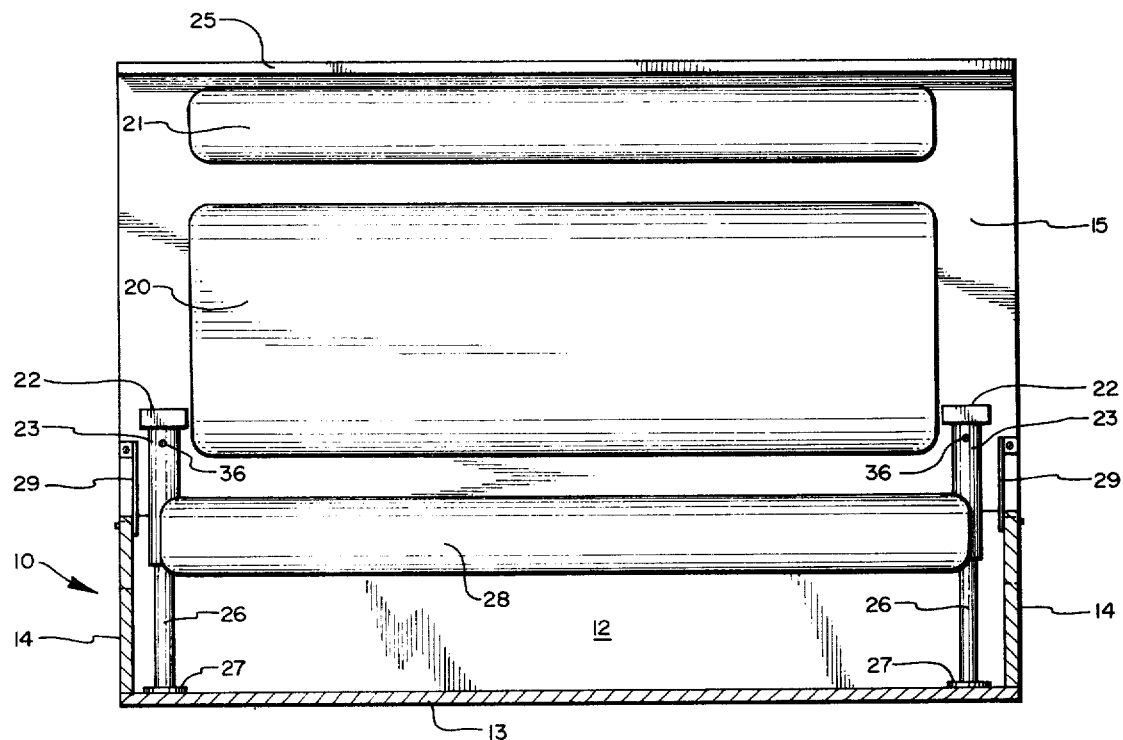
FIG. 4 is a front elevational view of the collapsible seat in an upright position with the frontwall of the enclosure being removed.
Figure 5:
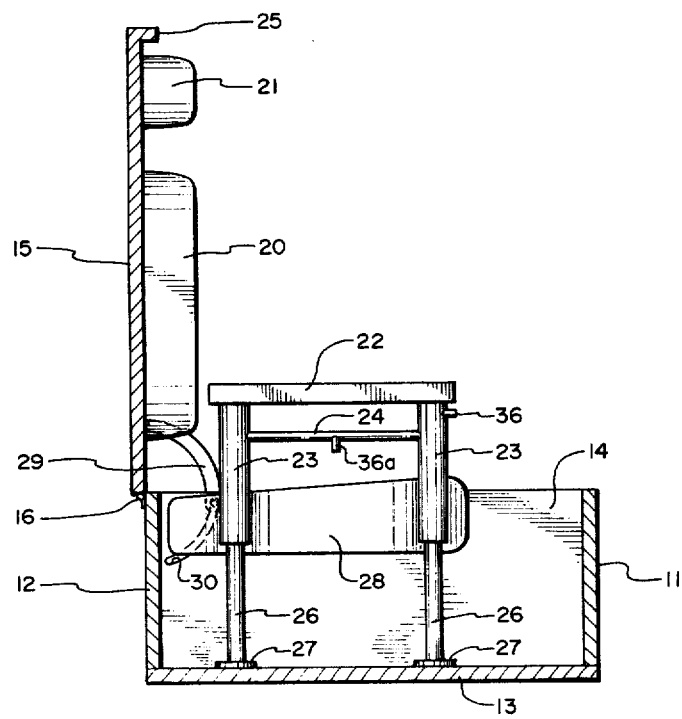
FIG. 5 is an end elevational view of the collapsible seat in an upright position with the forward endwall being removed.
Figure 6:
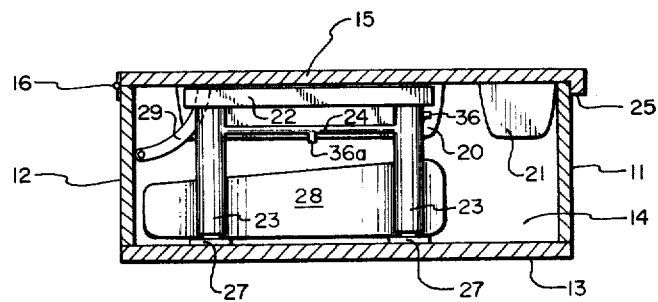
FIG. 6 is an end elevational view of the collapsible seat in the closed position with the forward endwall being removed.

The actual seating arrangement of the collapsible seat and the positioning of the seat in the closed position can best be illustrated with reference to FIGS. 4, 5 and 6. As previously indicated, the enclosure consists of a frontwall 11 (omitted from FIG. 4), a backwall 12, a floor 13, two endwalls 14, and a cover 15 which is pivotally connected to the backwall by a hinge or other connecting means 16. Also contained on the cover of the enclosure may be a lip 25 to insure proper positioning of the cover in closed position.

The seating arrangement consists of two pair of vertically adjustable telescoping legs consisting of a cylinder portion 23, a piston portion 26 which is attached to the floor 13 by a broadened base or other supporting means 27.

Attached to the lower portion of the cylinder part 23 of the telescoping legs is seat 28 which moves vertically in relation to the amount of air forced into the cylinder chamber as hereinafter described. The cover contains, on the underside, a backrest 20 and headrest 21. Attached to the enclosure cover near the lower outer portion thereof, i.e., in the vicinity of the lower portion of the backrest are two braces which, when the enclosure is in a closed position, project inwardly and then backwardly toward the sidewall and then outwardly through arcuate apertures 30 in the endwall. As cover 15 is raised the brace 29 will rotate through the arcuate apertures 30 and the brace will come to rest against the end of the aperture 30 when the cover 15 is in a substantially upright position thereby providing a solid backrest. Other interengaging means between the endwall and backrest may also be used to support the backrest in an upright position.

Figure 7:
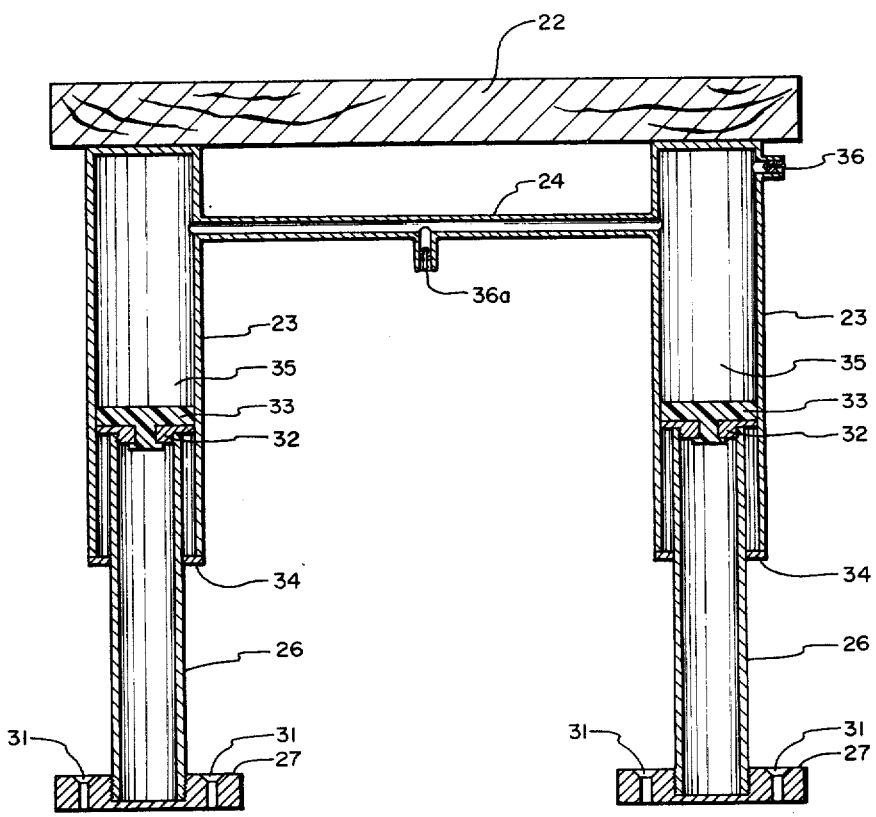
FIG. 7 is a vertical, sectional view of one pair of interconnected telescoping legs.

A cross section of a pair of telescoping legs is illustrated in FIG. 7. As illustrated, each telescoping leg consists of a piston portion 26 which is fixedly attached to the floor 13 by appropriate means. As illustrated in FIG. 7, the means consist of a base 27 containing holes 31 through which screws or bolts may be inserted. The piston 26 as illustrated consists of a hollow or tubular rod which is screwed into base 27 and which terminates at the upper end in inside threads into which is screwed a cap or plug 32 having an outwardly projecting flange having a circumference substantially that of the inside diameter of cylinder 23. As illustrated in FIG. 7, the cap or plug serves as a means for securing a flexible disc 33 which creates an airtight seal between the outer edges of the disc and the inside walls of the cylinder 23. As illustrated, disc 33 consists of a cylindrical piece of flexible material such as rubber having fastening means in the center portion thereof in the form of a downward extension which passes through a hole in the plug 32, the end of said extension flaring outwardly at a 90 degree angle which fixedly secures the disc 33 into the cap 32. Other fastening means can, however, be used equally well. For example, the center of cap 32 could be threaded and a hole drilled in the center of disc 33 and a screw used to pass through a hole in the disc and into the threaded portion of cap 32.

It should also be emphasized that the piston 26 need not be made of a tubular material, but could be solid material such as hardwood, an impact resistant plastic and the like.

The cylinder portion 23 fits over the piston 26 in an airtight relationship and may contain at the bottom thereof an annular ring 34 having an outer circumference the same as the outer circumference of cylinder 23 and having the hole therein slightly larger than the circumference of piston 26. Obviously disc 33 would have to be placed over piston 26 prior to the piston being attached to base 27 or prior to cap 32 being screwed into the piston. Ring 34 may then be affixed to the bottom of the cylinder by appropriate fastening means such as screws, welding, gluing and the like. When annular ring 34 engages the outer flanges of cap 32 no further upward movement can be made. If desired flexible washers or rings may be placed around piston 26 below Cap 32 and above base 27 which would serve to frictionally engage the inside walls of cylinder 23 against said washers or rings thereby helping to hold the cylinder in any given position. As noted in FIG. 7 an airtight pocket or compartment 35 is created between the top of the cylinder and the airtight disc 33. Interconnecting means 24 serves to provide a means whereby each pair of telescoping legs will rise at the same rate when pressurized pneumatically through valve 36 or auxiliary valve 36a depending on the desired positioning of the valve.

When using the collapsible seat, the cover 15 is raised to an upright position and the air is applied intermittently to each pair of telescoping legs until said legs are raised to the appropriate position. However, if desired, all four telescoping legs may be raised at the same time by using an additional interconnecting means not shown which would simultaneously interconnect all four airtight compartments 35 of the telescoping cylinder legs. By applying air to the cylinder the cylinder rises and the seat moves upwardly to the desired position. Adequate space is provided between the front of seat 28 and frontwall 11 for leg space. However, if desired and depending upon the arrangement of the seat enclosure, the frontwall 11 could be pivotally attached to floor 13 and swung downwardly in a forward direction creating as much leg room as desired. To enclose the seat one merely has to let the air out of the cylinders and the seat automatically lowers, the cover then is closed and the seat is in a cargo carrying position.

Although the invention as has been described is deemed to be that which would form a preferred embodiment, it is recognized that departures may be made therefrom without departing from the scope of the invention which is not limited to the details disclosed, but is to be accorded the full scope of claims so as to include any and all equivalent devices and means.

What is claimed is:

1. In combination with a vehicle bed, a vertically adjustable, collapsible seat being totally enclosed in the collapsed position forming a flat surface area comprising:
   a. an enclosure having a floor, a frontwall, a backwall, two endwalls and a cover pivotally attached to the backwall,
   b. two pairs of vertical telescoping legs attached to the floor of the enclosure, the legs of each pair containing interconnected airtight cylinder compartments which are vertically expandable by pneumatic means and,
   c. a seat fixedly attached at each end to the movable portions of the telescoping legs.

2. A seat as claimed in claim 1 wherein a backrest is attached to the underside of the enclosure cover.

3. A seat as claimed in claim 2 wherein the tops of each pair of telescoping legs are interconnected by an armrest.

4. A seat as claimed in claim 3 wherein the enclosure cover and endwalls contain interengaging means which limit movement of the enclosure cover from a closed to a substantially upright position.

5. A seat as claimed in claim 4 wherein the interengaging means consist of two solid braces attached to the enclosure cover near the backward corners and which, when the enclosure cover is in a closed position, extend inwardly and backwardly toward the backwall and then outwardly through arcuate openings in each endwall such that when the enclosure cover is raised the brace will move forwardly through the arcuate opening and be restrained against the forward end of the arcuate opening when the cover is in an upright position.

6. A seat as claimed in claim 4 wherein each telescoping leg consists of a piston portion and a cylinder portion, the bottom of the piston portion being attached to the floor of the enclosure and the top of the piston portion containing a flexible disc, said piston being slidably engaged in the cylinder portion such that the flexible disc engages the inside wall of the cylinder in an airtight relationship creating an airtight cylinder compartment between the flexible disc and the top of the cylinder.

7. A seat as claimed in claim 6 wherein the interconnecting portion between the airtight cylinder compartments is housed within the armrest attached to the top of the cylinder portion of each pair of telescoping legs.

8. A seat as claimed in claim 6 wherein the flat surface area of the seat in the collapsed position forms a cargo carrying area.

9. A seat as claimed in claim 8 wherein the vehicle bed contains sidewalls which are higher than the sidewalls of the seat enclosure.

10. A seat according to claim 9 wherein the vehicle bed is a pickup truck bed.

* * * * *